No. 11,730. Reissued Apr. 4, 1899.
A. L. IDE, Dec'd.
A. F., R. W. & F. P. IDE, Executors.
LUBRICATING DEVICE FOR STEAM ENGINES.
(Application filed Dec. 6, 1898.)
2 Sheets—Sheet 1.
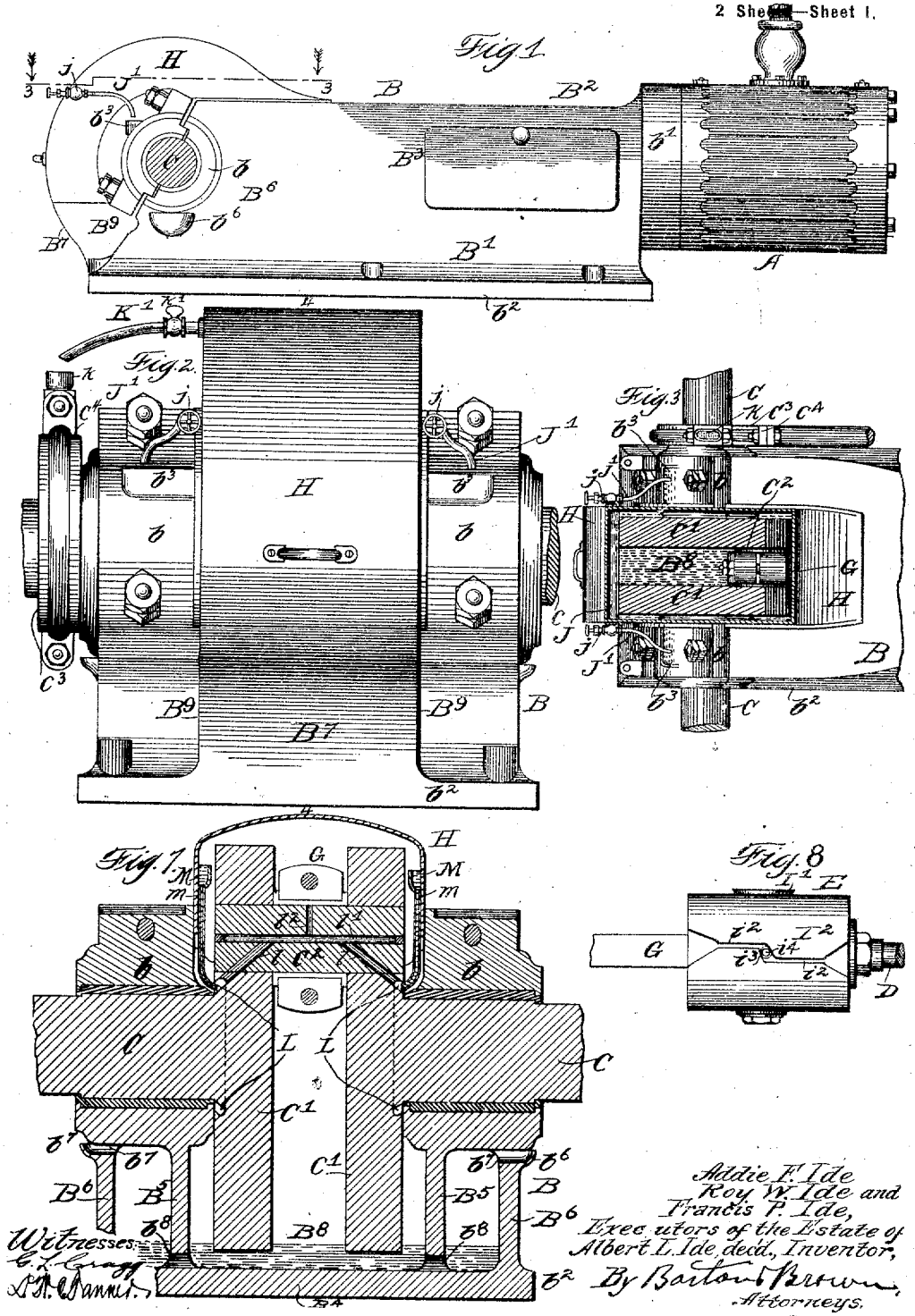
Witnesses:
E. L. Gregg
L. M. Wannel.
Addie F. Ide
Roy W. Ide and
Francis P. Ide,
Executors of the Estate of
Albert L. Ide, decd., Inventor,
By Barton Brown,
Attorneys.

No. 11,730. Reissued Apr. 4, 1899.
A. L. IDE, Dec'd.
A. F., R. W. & F. P. IDE, Executors.
LUBRICATING DEVICE FOR STEAM ENGINES.
(Application filed Dec. 6, 1898.)
2 Sheets—Sheet 2.
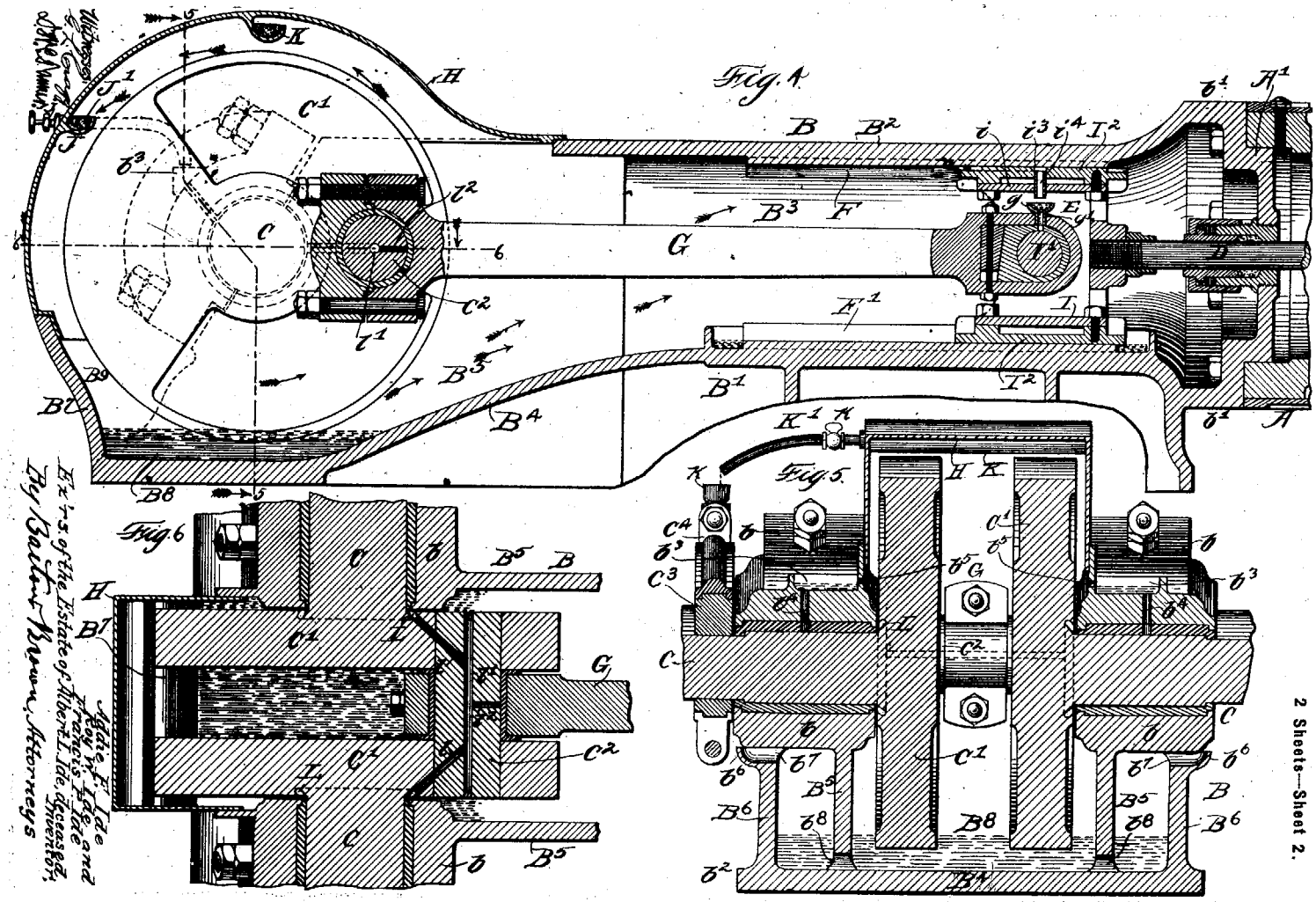

UNITED STATES PATENT OFFICE.

ADDIE F. IDE, ROY W. IDE, AND FRANCIS P. IDE, OF SPRINGFIELD, ILLINOIS, EXECUTORS OF ALBERT L. IDE, DECEASED.

LUBRICATING DEVICE FOR STEAM-ENGINES.

SPECIFICATION forming part of Reissued Letters Patent No. 11,730, dated April 4, 1899.

Original No. 400,632, dated April 2, 1889. Application for reissue filed December 6, 1898. Serial No. 698,492.

*To all whom it may concern:*

Be it known that ALBERT L. IDE, formerly of Springfield, in the county of Sangamon and State of Illinois, now deceased, did invent certain new and useful Improvements in Lubricating Devices for Steam-Engines, of which the following is a full, clear, and exact description, reference being had to the accompanying drawings, and to the letters of reference marked thereon, which form a part of this specification.

This invention relates to improvements in steam, gas, or other engines, and more particularly to improvements in lubricating devices for the crank-shaft, connecting-rod, cross-head, and other parts of such engines.

The invention consists in the matters hereinafter described, and pointed out in the appended claims.

The invention is herein shown as illustrated in connection with a horizontal stationary engine of that class having two crank-disks; but the main features of the invention may be applied to engines of upright or other forms and to other than stationary engines.

The engine-frame herein shown is similar in its general features of construction to the frame illustrated and described in a separate application for patent, Serial No. 264,607, filed February 20, 1888.

In the said drawings, Figure 1 is a side elevation of a steam-engine constructed in accordance with the invention. Fig. 2 is an end elevation of the same. Fig. 3 is a horizontal plan section taken upon line 3 3 of Fig. 1. Fig. 4 is a longitudinal vertical section of the engine, taken upon line 4 4 of Fig. 2. Fig. 5 is a transverse section taken through the crank-shaft of the engine on the line 5 5 of Fig. 4. Fig. 6 is a horizontal section taken upon line 6 6 of Fig. 4. Fig. 7 is a detail section illustrating a modification of the oiling devices shown in Fig. 6. Fig. 8 is a plan view of the cross-head shown in Fig. 4.

As illustrated in the drawings, A is the engine-cylinder, and B is a horizontal continuous frame or bed supporting the bearings of the crank-shaft at one end and the cylinder A at its opposite end, the cylinder being secured to the extreme end of the frame, so as to overhang the latter.

C is a crank-shaft which has bearings $b$ $b$ at one end of the frame B. Said shaft C is provided between the bearings $b$ $b$ with two crank-disks C′ C′, in which is secured a crank-pin $C^2$. Said shaft is also herein shown as provided with an eccentric $C^3$, by which the steam-valve is actuated.

D is the piston-rod of the engine, which is attached to a cross-head E, which is held in guides F F′, formed upon the engine-frame. Said piston-rod is connected with the crank-pin $C^2$ by means of a connecting-rod G in the usual manner.

The engine-frame B contains certain novel features of construction, as set forth in said separate application filed simultaneously herewith. Said frame is provided with an overhanging cylindric part $b'$, to which the cylinder is attached and which is herein shown as cast integral with the cylinder-head A′. The lower part of the frame is formed by a hollow base B′, having the characteristics of a box-girder. Said lower portion or base terminates in a longitudinal flange $b^2$, which rests on the engine-bed and extends from a point near the cylinder-head to a point beneath the shaft-bearings $b$ $b$. The main or upper portion of the frame in its part $B^2$ adjacent to the cross-head guides F F′ consists of two side walls $B^3$ $B^3$, which connect the said cross-head guides at both sides thereof, so as to make the said part $B^2$ practically tubular, said side walls $B^3$ forming an upward continuation of the side walls of the base portion B′, as clearly set forth in said separate application for patent. The lower wall of the tubular part of the frame is extended from the lower cross-head guide to form a wall $B^4$, which slopes downwardly beneath the crank-disks and joins the flange $b^2$ at the level of the bottom of the frame. The bearings $b$ $b$ are supported by inner and outer walls $B^5$ $B^6$, forming extensions of the side walls of the tubular part $B^2$ and extending downwardly to the said bottom plate $B^4$, as clearly set forth in said separate application.

$B^9$ $B^9$ are two vertical walls extending rearwardly from the walls $B^5$ and connected with a transverse end wall $B^7$, extending between the said walls $B^9$ $B^9$ at the end of the frame exterior to the crank-disks C′ C′ and forming with the side walls $B^9$ $B^9$ and the bottom wall $B^4$ a basin or tank $B^8$ for containing a quantity of oil or other lubricant in which the peripheries of the crank-disks are immersed when the engine is running.

H is a removable cover which is fitted to the adjacent margins of the side walls $B^5$ and $B^9$, the end wall $B^7$, and the adjacent margin of the tubular part $B^2$ of the frame and is shaped to completely inclose or cover the crank-disks C′ C′. Said cover H serves to protect from dust and dirt the several moving parts within the frame, as set forth in said simultaneously-filed application, and also serves, in connection with the engine-frame, to form a casing or housing which operates, in connection with lubricating devices constructed as herein shown and claimed, to prevent the escape of lubricating material which may be thrown outwardly by the crank-disks C′ C′ and to aid in supplying lubricant to the several bearings of the engine.

In the use of an engine-frame contructed to form a housing or casing which entirely incloses and surrounds the crank-disks and the cross-head guides and which is provided in its lower part, beneath the crank-disks, with an oil-tank $B^8$, as shown and described, the crank-disks when turned in a direction to carry their lower parts or surfaces toward the engine-cylinder act to take up and throw forward, mainly toward the cylinder, but also into other parts of the housing, drops or particles of the oil or other lubricant contained within the said receptacle $B^8$, as indicated by the arrows in Fig. 4. The drops or particles of oil or lubricant thus thrown or cast upwardly and forwardly by the crank-disks will be distributed throughout the interior of the casing or housing and serve to afford a continual and abundant supply of lubricant upon the surfaces of the cross-head guides and will commonly afford a sufficiently abundant supply of lubricant to the pivotal connection between the connecting-rod and the cross-head.

The cross-head illustrated in Fig. 4 is generally similar to that shown in a prior patent, No. 321,726, dated July 7, 1885, said cross-head being hollow or of box form and consisting of a rectangular main part I, in the side walls of which a wrist-pin I′ is supported, and bearing-plates $I^2$ $I^2$, attached to the upper and lower surfaces of the main part of the cross-head and directly engaging the guides.

As illustrated in Figs. 4 and 8, a construction is provided for conducting the lubricant from the upper guide to the wrist-pin or which is similar to that shown in said prior patent, No. 321,726, hereinbefore referred to. In this instance the head of the connecting-rod G is provided with an oil-receptacle $g$, communicating with the bearing-surface of the wrist-pin I′ by means of a passage $g'$. In the upper surface of the plate $I^2$ are formed two channels $i^2$ $i^2$, leading from the ends of the plate to a central orifice $i^3$, Fig. 8. A pipe or tube $i^4$ leads from the said orifice $i^3$ through the upper wall $i$ of the main part of the cross-head to a point over the oil-receptacle $g$. The ends of the passages $i^2$ $i^2$ are spread or widened in order to collect or gather the oil from a considerable part of the surface of the cross-head guide, as clearly shown in said Fig. 8 and as described in said prior patent. In the operation of the parts when thus constructed the oil thrown upon the upper cross-head guide by the action of the crank-disks is scraped from the surface of the guide by the plate $I^2$ as the cross-head reciprocates and, passing through the passages $i^2$ $i^2$, enters the tube $i^4$, by which it is delivered to the oil-receptacle $g$. A constant and abundant supply of oil is thus afforded to the wrist-pin I′ while the engine is in operation.

For lubricating the crank-shaft bearings $b$ $b$ devices are provided as follows: Upon the inner surface of the cover H, in position to receive the oil or lubricant running down or over a part of the surface of said cover, is located a trough or receptacle J, to which are connected pipes or tubes J′ J′, arranged to discharge into oil-cups $b^3$ $b^3$, located or cast upon the bearings $b$ and communicating by passages $b^4$ $b^4$ with the bearing-surfaces of the crank-shaft. The interior trough or receptacle J, herein shown, is extended across the rear end or wall of the cover or housing H, so as to receive the lubricant cast upon and running down the under surface of the rear part of said cover H. The said trough also receives directly some of the drops or particles of lubricant cast outwardly from the crank-disks. The pipes J′ J′ are in the instance illustrated connected with opposite ends of the said trough J; but said pipes may obviously be connected with separate troughs where found necessary or desirable. Each of the pipes J′ is herein shown as provided with a valve $j$, by which the flow of oil therethrough may be controlled as desired. To avoid possibility of overflow from the oil-cups $b^3$, the same are herein shown as extended horizontally to a point adjacent to the inner side wall $B^5$ of the engine-frame, in which wall is made an opening $b^5$, Fig. 5, leading from the upper part of said oil-cup through the said wall to the exterior space of the frame, so that the oil delivered to the said oil-cup $b^3$ will pass through the said opening $b^5$ in case the oil is supplied to said cup faster than taken up by the crank-shaft bearing, thereby avoiding possibility of overflow of the oil-cup.

In order to prevent the oil which may pass or work out of the outer ends of the crank-shaft bearings $b$ $b$ from running down over the exterior of the frame, there is preferably cast upon the exterior side walls $B^6$ $B^6$, beneath the bearings, oil-cups $b^6$ $b^6$, which communicate with the spaces between the walls $B^5$ $B^6$ by means of passages $b^7$ through said outer walls. The oil which enters said spaces from the cups $b^6$ $b^6$ is allowed to flow back into the basin $B^8$ by means of openings $b^8$ $b^8$ in the inner wall $B^5$ $B^5$.

Means for supplying lubricant to the eccentric $C^3$ are herein provided as follows:

K is a receptacle or trough located near the top of the cover H and receiving lubricant partially by accumulation from that thrown upon the under surface of the said housing and partially by gathering the particles of oil cast directly therein by the rapidly-revolving crank-disks. The trough K communicates at its end with an exterior pipe K', which discharges at its end over an oil cup or receptacle *k*, mounted upon the eccentric-strap $C^4$. The pipe K' is provided with a valve *k'*, by which the flow of oil therethrough may be regulated as desired.

In an engine having parts inclosed by a casing or housing and in which the crank disk or disks run in an oil-tank beneath them, so as to distribute a lubricant within said frame or housing in the manner set forth, a uniform and abundant supply of oil to the crank-pin $C^2$ may be provided in a number of different ways.

There is shown in Figs. 4, 5, and 6 a construction for this purpose wherein the surplus oil from the inner end of one or both of the crank-shaft bearings is carried or fed directly to the bearing-surface of the crank-pin. In this instance an annular groove or channel L is formed in the exterior surface of each crank-disk C' adjacent to the surface of the crank-shaft. Said groove or channel L extends obliquely into the body of the crank-disk in such manner that its inner part is at a greater distance from the central axis of the disk than its outer part or opening, so that any oil which may pass into said groove or channel from the bearing-surface of the crank-shaft will be thrown and held by centrifugal action, due to the rapid rotation of the disk, into the exterior part of the said channel. Said channel communicates by a passage *l* with an axial passage *l'*, extending through the crank-pin, and from said passage *l'* extends another passage $l^2$, leading to the bearing-surface of the crank-pin. The passages *l* and $l^2$ are desirably arranged in radial lines, so that in the rotation of the crank-disks the oil will tend to flow freely outward therethrough. In the operation of the parts thus constructed a considerable part of the oil fed or delivered to the shaft-bearings *b b* will escape at the inner part of the bearing and, coming in contact with the crank-disks, will be thrown outwardly by centrifugal action and enter the outer parts of the channels L L. When within said channel, the centrifugal action will cause the said oil to pass through the passages *l*, *l'*, and $l^2$, by which the oil will be delivered to the bearing-surface of the crank-pin in a manner readily understood. It is not essential, however, in a crank-pin-lubricating device of the general character described that the oil should be delivered to the channel L solely from the shaft-bearing. There is illustrated, for instance, in Fig. 7 a construction wherein the oil is supplied to said channels by other means. In this instance M is an oil receptacle or trough formed upon the inner surface of the housing H and adapted to receive the oil thrown upon the said housing by the rotation of the disks and flowing downwardly upon the under surface of the same in the same manner as before described in connection with the oil-receptacle J.

The receptacle M communicates with a tube or pipe *m*, which leads to a point adjacent to the crank-shaft bearing and has its lower end located in such position that the oil flowing or dripping therefrom will fall upon the crank-disk at a point inside of the said channel or within the channel itself. When this construction is employed, the centrifugal action will throw or carry the oil thus delivered to the surface of the crank-disk or to the channel outwardly through the passages *l l' l²* to the bearing-surface of the crank-pin in the same manner as hereinbefore described.

It will be understood from the above that this invention embraces as one of its main features the combination, with an oil-receptacle in which a crank disk or disks turn and a housing surrounding said disks, of a receptacle to receive the oil delivered to and dripping or flowing from an interior surface or surfaces of the housing and a passage or passages connecting said oil-receptacle with the surface to be oiled or lubricated, and this construction is claimed, broadly, as applied to the oiling of any moving part of the engine—as, for instance, it will be readily seen that the construction illustrated in Fig. 4, wherein the trough J receives the lubricant from the surface of the housing above it and communicates with the shaft-bearing by suitable passages, embodies the same principles of construction and operation which are present in the device illustrated in a separate application, Serial No. 281,944, filed August 4, 1888, wherein oil drips from the points or projections upon the inner surface of the housing and enters an oil-receptacle attached to and moving with the connecting-rod head.

The casing or housing surrounding the disks and other operative parts is herein shown as being formed partially by the engine-frame, which is made of peculiar form for this purpose, and partially by a separate piece or hood, and the oil tank or basin is herein shown as formed in or by the frame itself. As far as the operation of the lubricating device described and broadly claimed is concerned, however, it will be readily seen that said tank may be separate from the frame and that an inclosing casing or housing for the operative parts of the engine may be made otherwise than as above set forth. The invention is therefore not limited to a construction in a housing or casing formed partially by the engine-frame or to any other specific features of construction in the said housing or casing itself, except as certain novel features of construction in said parts herein illustrated may form the subject of specific claims herein.

Certain novel features of construction in the particular lubricating devices illustrated are herein specifically claimed as separate improvements in addition to the main features of the invention above set forth.

What is claimed is—

1. The combination, with a steam-engine crank-shaft and disk and an engine-frame affording bearings for the shaft and formed to provide an oil tank or basin beneath the disk, the side walls of which rise to a point above the lower edge of the disk, of a detachable cover fitted to the frame and forming with the latter a closed housing surrounding the crank-disk and adjacent parts, a trough or receptacle located upon the inner surface of the cover in position to receive from the same lubricant thrown thereon by the disk, and a pipe attached to the housing communicating with said trough and leading to a bearing-surface to be lubricated, substantially as described.

2. The combination, with a crank-shaft and a crank-disk, of an oil tank or basin beneath the disk, the side walls of which rise to a point above the lower edge of the disk, a housing or casing provided with an oil-receiving surface arranged in the same plane with the disk, a trough located within the housing in position to receive from the said oil-receiving surface fluid lubricant cast thereupon by the crank-disk, a pipe leading from said trough to a bearing to be lubricated, and a valve in said passage, substantially as described.

3. The combination, with an engine crank-shaft, a crank-disk thereon, an oil tank or basin beneath the disk, a housing provided with an oil-receiving surface and a bearing for the shaft provided with an oil cup or receptacle, a trough or receptacle located in position to receive from the surface of the housing lubricant cast upon the same by the disk, of a pipe communicating with said trough or receptacle and discharging into the oil-cup upon the bearing, said oil-cup being provided with an overflow pipe or passage leading into the housing, substantially as described.

4. In a self-lubricating steam-engine, the combination with an engine crank-shaft, of a crank-disk thereon, an oil tank or basin beneath the disk, a housing provided with an oil-receiving surface, a bearing for the shaft provided with an oil cup or receptacle, a trough or receptacle located in position to receive from the surface of the housing lubricant cast upon the same by the disk, a pipe or passage communicating with said trough or receptacle and discharging into the oil-cup upon the bearing, said oil-cup being provided with an overflow pipe or passage leading into the housing, an inclosed or tubular portion communicating with the housing and extending horizontally therefrom, a horizontally-traveling cross-head located within the horizontal tubular or inclosed portion, and a connecting-rod uniting the crank-disk and cross-head, said disk serving to cast oil from the tank or basin beneath the disk into the said tubular or inclosed portion to lubricate working parts of the engine within said tubular or inclosed portion, a passage being provided for returning the oil from the tubular or inclosed portion to the basin beneath the disk, substantially as described.

5. In a self-lubricating steam-engine, the combination with an engine crank-shaft, of a crank-disk thereon, an oil tank or basin beneath the disk, a housing provided with an oil-receiving surface, a bearing for the shaft provided with an oil cup or receptacle, a trough or receptacle located in position to receive from the surface of the housing lubricant cast upon the same by the disk, a pipe or passage communicating with said trough or receptacle and discharging into the oil-cup upon the bearing, said oil-cup being provided with an overflow pipe or passage leading into the housing, an inclosed or tubular portion communicating with the housing and extending horizontally therefrom, a horizontally-traveling cross-head located within the horizontal tubular or inclosed portion, a wrist-pin carried by the cross-head, and a connecting-rod uniting the crank-disk with the wrist-pin said disk serving to cast oil from the tank or basin beneath the disk into the said tubular or inclosed portion, to lubricate working parts of the engine within said tubular or inclosed portion, a passage being provided in the cross-head for conveying oil cast into the interior of the said tubular portion to the wrist-pin, a second passage being provided for returning the oil from the tubular or inclosed portion to the basin beneath the disk, substantially as described.

In testimony whereof we hereunto subscribe our names in the presence of two witnesses.

ADDIE F. IDE,
ROY W. IDE,
FRANCIS P. IDE,
*Executors under the last will and testament of Albert L. Ide, deceased.*

Witnesses:
H. L. IDE,
GEORGE M. BRINKERHOFF, Jr.